US012091809B1

(12) United States Patent
Allen et al.

(10) Patent No.: US 12,091,809 B1
(45) **Date of Patent: *Sep. 17, 2024**

(54) HEATED AND COOLED SEAT FOR LOCKER

(71) Applicant: AIM Design, LLC, Desoto, TX (US)

(72) Inventors: Sam Allen, Maypearl, TX (US); John Allen, Desoto, TX (US)

(73) Assignee: AIM Design, LLC, Desoto, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,430

(22) Filed: Aug. 1, 2023

Related U.S. Application Data

(63) Continuation of application No. 17/828,817, filed on May 31, 2022, now Pat. No. 11,713,538, which is a continuation of application No. 17/494,057, filed on Oct. 5, 2021, now Pat. No. 11,346,041, which is a continuation of application No. 17/138,439, filed on Dec. 30, 2020, now Pat. No. 11,136,708, which is a continuation of application No. 16/804,879, filed on Feb. 28, 2020, now Pat. No. 10,883,221.

(51) Int. Cl.

| | |
|---|---|
| ***A47B 61/00*** | (2006.01) |
| ***D06F 58/10*** | (2006.01) |
| ***F26B 25/14*** | (2006.01) |
| *F25D 13/02* | (2006.01) |
| *F26B 9/06* | (2006.01) |

(52) U.S. Cl.
CPC .............. *D06F 58/10* (2013.01); *A47B 61/00* (2013.01); *F26B 25/14* (2013.01); *F25D 13/02* (2013.01); *F26B 9/066* (2013.01)

(58) Field of Classification Search
CPC ........... A47C 1/00; A47C 15/004; A47C 7/24; A47C 7/26; G07F 9/105; G07F 17/12; D06F 58/10; D06F 57/12; F26B 21/004; F26B 3/04; F26B 9/06; F26B 21/001; F26B 21/00; F26B 21/14; F26B 9/10; F26B 25/14; F26B 9/066; A47B 61/00; F25D 13/02
See application file for complete search history.

(56) References Cited

U.S. PATENT DOCUMENTS 2,686,613 A 8/1954 Tamminga
3,353,865 A 11/1967 Bass
(Continued)

OTHER PUBLICATIONS

Office Action dated Jun. 9, 2020 from U.S. Appl. No. 16/804,879.
(Continued)

*Primary Examiner* — Chi Q Nguyen
(74) *Attorney, Agent, or Firm* — James E. Walton

(57) ABSTRACT

An improved locker seat includes a pair of spaced-apart upstanding sidewalls having a pair of lateral edges. A generally horizontal seat is disposed between the lateral edges of the sidewalls. In a first mode, an air source is connected to an airway formed within the seat to create an airflow. The airflow from the air source creates a first temperature differential to cool the seat. In a second mode, an external or internal heat source provides heat to a top surface of the seat, creating a second temperature differential to heat the seat. The first and second temperature differential are distributed across the top surface of the seat. The seat is hinged to be movable about the hinge between an open and a closed position.

5 Claims, 5 Drawing Sheets

(56) References Cited

U.S. PATENT DOCUMENTS

| | | | |
|---|---|---|---|
| 5,369,892 A | 12/1994 | Dhaemers | |
| 5,812,643 A | 9/1998 | Schelberg, Jr. et al. | |
| 5,815,961 A | 10/1998 | Estes et al. | |
| 5,921,858 A | 7/1999 | Kawai et al. | |
| 6,018,885 A | 2/2000 | Hill | |
| 6,189,346 B1 | 2/2001 | Chen et al. | |
| 6,273,810 B1 | 8/2001 | Rhodes, Jr. et al. | |
| 7,261,384 B1 | 8/2007 | Craft, Jr. et al. | |
| 7,900,371 B1 | 3/2011 | Bullard | |
| 8,006,336 B1 | 8/2011 | Gerlach et al. | |
| 8,484,860 B2 | 7/2013 | Moon et al. | |
| 9,906,897 B2 | 2/2018 | Milne et al. | |
| 9,955,784 B1 | 5/2018 | Smith | |
| 10,883,221 B1 | 1/2021 | Allen et al. | |
| 10,895,418 B1 | 1/2021 | Allen et al. | |
| 10,932,567 B1 | 3/2021 | Allen | |
| 10,935,316 B2 | 3/2021 | Allen | |
| 11,136,708 B1 | 10/2021 | Allen et al. | |
| 11,346,041 B1 | 5/2022 | Allen et al. | |
| 11,713,538 B1 * | 8/2023 | Allen | A47C 9/06 312/236 |
| 2006/0261643 A1 | 11/2006 | Lingwall | |
| 2007/0040421 A1 | 2/2007 | Zuzga et al. | |
| 2011/0025181 A1 | 2/2011 | Vinke et al. | |
| 2015/0008809 A1 | 1/2015 | Palumbo | |
| 2016/0258108 A1 | 9/2016 | Jindra et al. | |
| 2018/0058760 A1 | 3/2018 | Allen | |
| 2018/0135237 A1 | 5/2018 | Yoon et al. | |
| 2019/0365094 A1 | 12/2019 | Allen | |
| 2020/0256008 A1 | 8/2020 | Yoon et al. | |
| 2021/0080983 A1 | 3/2021 | Meggers et al. | |

OTHER PUBLICATIONS

Amendment dated Aug. 31, 2020 from U.S. Appl. No. 16/804,879.

Notice of Allowance dated Sep. 8, 2020 from U.S. Appl. No. 16/804,879.

Office Action dated Mar. 29, 2021 from U.S. Appl. No. 17/138,439.

Amendment dated Jun. 17, 2021 from U.S. Appl. No. 17/138,439.

Final Office Action dated Jun. 30, 2021 from U.S. Appl. No. 17/138,439.

Response dated Jul. 23, 2021 from U.S. Appl. No. 17/138,439.

Notice of Allowance dated Aug. 5, 2021 from U.S. Appl. No. 17/138,439.

Office Action dated Feb. 7, 2022 from U.S. Appl. No. 17/494,057.

Amendment dated Feb. 22, 2022 from U.S. Appl. No. 17/494,057.

Notice of Allowance date Mar. 10, 2022 from U.S. Appl. No. 17/494,057.

Office Action dated Nov. 21, 2022 from U.S. Appl. No. 17/828,817.

Amendment dated Jan. 31, 2023 from U.S. Appl. No. 17/828,817.

Final Office Action dated Feb. 9, 2023 from U.S. Appl. No. 17/828,817.

Response to Final Office Action dated Mar. 6, 2023 from U.S. Appl. No. 17/828,817.

Notice of Allowance dated Mar. 22, 2023 from U.S. Appl. No. 17/828,817.

* cited by examiner

HEATED AND COOLED SEAT FOR LOCKER

This application is a continuation of U.S. patent application Ser. No. 17/828,817 filed on 31 May 2022, titled "Heated and Cooled Seat for Locker," which issued as U.S. Pat. No. 11,713,538 on 1 Aug. 2023, which is a continuation of U.S. patent application Ser. No. 17/494,057, filed on 5 Oct. 2021, titled "Heated and Cooled Seat for Locker," which issued as U.S. Pat. No. 11,346,041 on 31 May 2022, which is a continuation of U.S. patent application Ser. No. 17/138,439, filed on 30 Dec. 2020, titled "Heated and Cooled Seat for Locker," which issued as U.S. Pat. No. 11,136,708 on 5 Oct. 2021, which is a continuation of U.S. patent application Ser. No. 16/804,879, filed on 28 Feb. 2020, titled "Heated and Cooled Seat for Locker," which issued as U.S. Pat. No. 10,883,221 on 5 Jan. 2021, all of which are incorporated herein by reference for all purposes.

BACKGROUND

1. Field of the Invention

The present invention relates generally to improvements in lockers or storage cabinets used in athletic or sporting facilities, and more specifically to seating incorporated into such lockers.

2. Description of Related Art

The aesthetics and utility of lockers or storage cabinets in "locker rooms" of athletic and sporting facilities of sports teams and country clubs, for example, have become a measure of the quality and prestige of such organizations and an increasingly important aspect of recruiting new team or club members. Modern lockers are a far cry from the simple wood or metal cabinets of the past.

Modern lockers incorporate storage for specific items of equipment, such as helmets and shoes, and features promoting comfort and luxury. There is a constant need for improvement in both functional and aesthetic aspects of such lockers.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
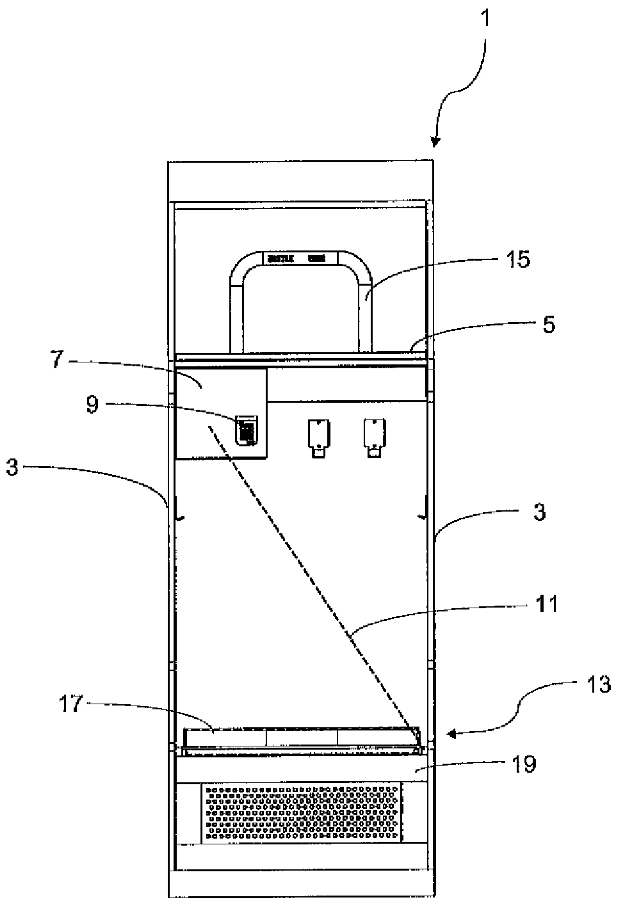
FIG. 1 is an elevation view of a locker incorporating the seat assembly according to the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the locker seat assembly are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1 in the drawings, locker 1, incorporating a locker seat assembly 13 according to the present application is illustrated. As can be seen, locker 1 comprises a pair of upstanding sidewalls 3 that generally define the extent of the locker. Additional lockers may be installed adjacent to locker 1, being similar or identical to locker 1, with a rear against a wall, and a front facing the interior of the locker room.

Between the sidewalls 3 of each locker 1, a plurality of compartments 5 are defined by shelves or other horizontally extending surfaces or platforms (only one compartment 5 is indicated in locker 1 for clarity and simplicity). Multiple additional sidewalls and/or shelves may be placed between the "main" or exterior sidewalls 3 to define compartments and the like. As used herein, "sidewall" or "sidewalls" may refer to either "main" sidewalls 3 or other sidewalls arranged between the "main" sidewalls. Each compartment 5 may be sized and otherwise configured for storage of clothing or sporting equipment or other items and may include a door 7, having a lock 9.

The lock 9 may include a numeric keypad, biometric access, voice-activated commands, network connections for administrator access, such as when lock combinations or codes are forgotten or for the locker resident/owner to grant authorized access remotely, and combinations thereof. The lock 9 may control locking/unlocking one or all of compartments 5 in locker 1.

Locker 1 may include one or more network connections 11. For example, the one or more network connections 11 includes, but is not limited to, an electrical wire connecting the seat assembly 13, the lock 9, and/or the equipment drying rack 15 to AC power from the public power network. The one or more network connections 11 may also include a Cat-5 Ethernet cable connecting the locker to the Internet, a Bluetooth connection connecting electrical components of the locker to a mobile device, or a similar wired or wireless network connection.

The seat assembly 13 generally comprises a horizontal portion or bench 17 according to the present application. Bench 17 may be disposed and extend between main sidewalls 3 or other sidewalls defined between the main sidewalls 3. Bench 17 may extend at least partially forward of the front edges of sidewalls 3 and may be bordered by armrests or other structures raised above the sides of bench 17.

Bench 17 is connected to a front facial support 19 of the locker 1, to a rear support (not shown), or to sidewalls 13 of the locker by hinges at one or more of, left, right, inner, or outer extents of the bench respectively. Bench 17 is thus movable, about its hinges, between open and closed positions (the closed position is shown in FIG. 1).

As shown in FIG. 1, bench 17 may be generally aligned with the front edges of the sidewalls between which it is disposed, or may project forward or be recessed. Bench 17 may also be generally aligned with the lateral edges of the sidewalls between which it is disposed. Bench 17 preferably is padded and upholstered with an appropriate fabric, such as vinyl, leather, synthetic polyester, a woven fabric, or a textile material.

Recesses may be formed in the outer or inner edges of bench 17 that cooperate to form an aperture to facilitate opening the seat. Recesses may be of varying configuration (not shown), curved or square/rectilinear, and may be provided in only one of side of bench 17, multiple sides, or not at all.

Figure 2:
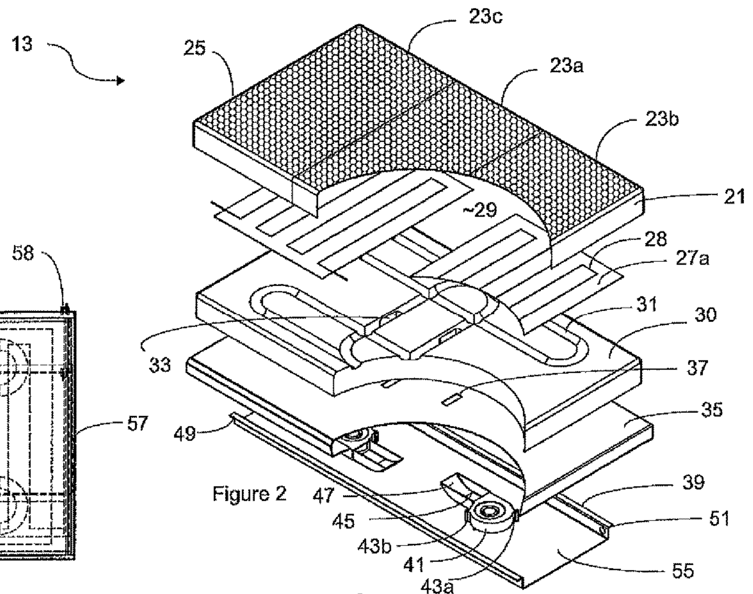
FIGS. 2 through 3 are exploded top and perspective views of the seat of the locker of FIG. 1.
Figure 3:
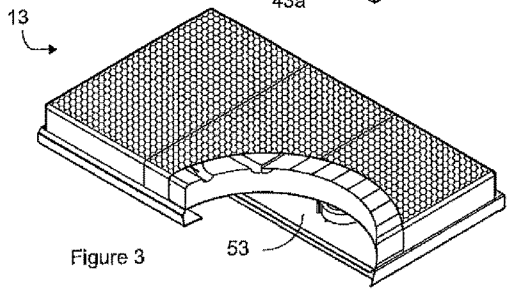
Figure 5:
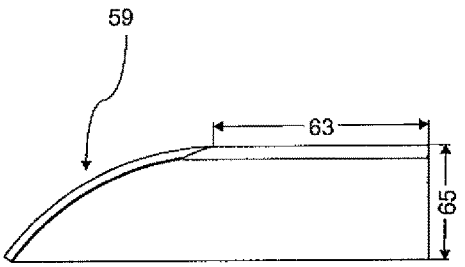
FIGS. 5 through 8 are enlarged, side, perspective, top, and rear views of a custom duct portion of the seat of the locker of FIG. 1.
Figure 6:
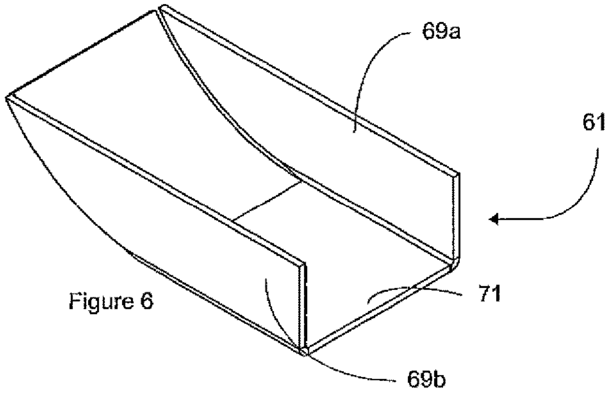
Figure 7:
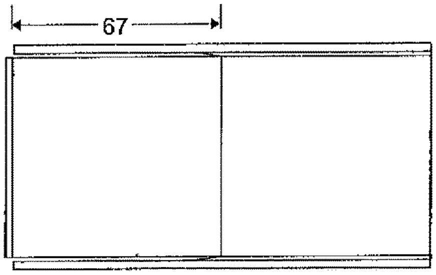
Figure 8:
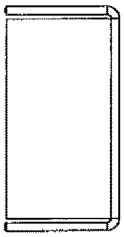

FIGS. 2 and 3 depict perspective and assembly views of seat assembly 13 having a seat cover 21. The seat cover 21 includes a center section 23*a*, right section 23*b*, and left section 23*c*. In a preferred embodiment, the center section 23*a* is configured for a first temperature differential, such as cooling. For example, the center section 23*a* is made of a perforated vinyl material having perforations 25. The left and right sections 23*b*, 23*c* are configured for a second temperature differential, such as heating. For example, the left and right sections 23*b*, 23*c* are made of a material that transfers heat better than vinyl, or is more durable over time despite experiencing seat-warming temperatures, such as a woven fabric. Each of the seat cover sections 23*a*, 23*b*, and 23*c* are configured to distribute a respective temperature differential across a top surface of the seat assembly 13 an through seat cover 21. For example, the perforations 25 in the center section 23*a* may span a majority, or more than half, of the surface area of center section 23*a*. By way of another example, the seat assembly 13 may include a heating pad 27 associated with each of the left and right sections 23*b*, 23*c*, where each respective heating pad 27*a*, 27*b* spans a majority, or more than half, the surface area of the respective section 23*b* or 23*c*. In other embodiments, the heating pads 27*a*, 27*b* span a portion of the center section 23*a*.

The heating pad 27 includes a temperature-controlled heating element 28 including a resistive wire arranged in an alternating vertical up-and-down pattern. Other resistive wire configurations, such as spiral, horizontal back-and-forth, diagonal, zig-zag, and combinations thereof, are also encompassed by the present application. The first heating pad 27*a* and second heating pad 27*b* are separated by a center gap 29, where a width of the center gap 29 varies depending on a number of factors, including but not limited to, cost of heating element 28, surface area of seat 13, and a configuration of recesses, openings, airways, or air channels 31.

The seat assembly 13 further includes a cushion 30. The cushion 30 is made from a high-density foam or batting material that is both elastic and workable. For example, an extra-firm urethane-based foam, such as part number HR 6130, from Rochford Supply, which passes Federal Motor Vehicle Safety Standard 302, or similar high-density foams may be used. The cushion 30 needs to retain the shape of an air channel 31 that is formed, melted, or cut into a surface of the cushion 30, such as with hot wire or hot knife foam cutters. It is noted that although FIG. 3 depicts air channel 31 formed in a top surface of cushion 30, other portions of cushion 30 may include an air channel 31. For example, a middle section, a back surface, or a side surface may also include an air channel 31.

Preferably, a cavity of the air channel 31 is rounded, sloped, or curved. However, other cavity shapes, such as square, angled, oblong, and rectangular are also encompassed by the present application. The air channel 31 includes a pair of straight parallel legs. However, other leg configurations may be used, such as curved, perpendicular, and serpentine.

Preferably, the parallel legs of air channel 31 are optimized for distribution across a cushion surface. For example, the parallel legs of the air channel 31 may be continuous, being connected by an arc length at each end of the parallel legs to facilitate a circular, looped, recycled, or continuous airflow. A first continuous air channel 31 is disposed laterally across the top surface of the cushion 30, and one or more second continuous air channels 31 are disposed horizontally across the top surface. The first air channel 31 is disposed at a generally central location relative to the cushion 30, while the one or more second air channels 31 are disposed at generally inner and outer extents relative to the locker 1, such as at the front and rear of the cushion 30. Preferably, the horizontal and lateral channels intersect.

The cushion 30 includes one or more air ports 33 cut or formed generally vertically through the body of the cushion 30. The one or more ports may be formed with a vertical foam cutter or a foam hot knife.

The seat assembly 13 further includes frame 35 having one or more holes or cut-outs 37 coaxially aligned with the air ports 33 of the cushion 30. Preferably, the frame is steel, but other rigid or semi-rigid materials, such as plastic, wood, and aluminum may also be used.

The seat assembly 13 further includes frame mounting bracket 39. Preferably, mounting bracket 39 supports an air source 41, having inlets 43*a*, 43*b*, and an outlet 45. The outlet 45 is connected to a custom duct 47. The frame mounting bracket 39 has one or more flanges 49 for attaching the mounting bracket 39 to the frame 35. The mounting bracket also includes an opening or electric port 51, for hardwired, electrical, fluid, tubing, drains, or other connections to the air source 41. The one or more flanges 49 of the mounting bracket 39 are mounted to the frame 35 to create an air cavity 53 between frame 35 and the mounting bracket 39. Preferably, the opening or electric port 51 is formed in a vertical member of the one or more flanges 49.

In embodiments, a compartment 5 is located beneath the seat assembly 13, and frame 35 supports the cushion 30 from underneath. Preferably, frame 35 extends slightly above a plane that is collinear with the underside of cushion 30 and slightly beyond the lateral and horizontal dimensions of the cushion 30. The portions that extend beyond the lateral and horizontal dimensions surrounding a perimeter of the cushion 30, and extending just slightly above the underside, or bottom surface, of the cushion 30. In alternative embodiments, the frame 35 is an internal frame being encompassed on at least five of its six sides by seat cover 21.

Preferably, the air source 41 is an internal air source, such as a blower or centrifugal fan, disposed within the frame 35, abutting a base surface 55 of the mounting bracket 39. Preferably, the seat 13 is configured to move between open and closed positions. In other embodiments, the seat 13 is configured to remain closed. When the seat 13 is configured to move between open and closed positions, the edge having electrical port 51 is a hinged edge of the seat 13 and wiring or connectors extending out of electrical port 51 is protected against wear and tear from constant movement, such as placing a flexible protective covering around the wire, running the wire through a coiled spring, coiling the wire, or through the use of other protective means.

Preferably, the seat assembly 13 is partially self-contained, meaning that at least heating pad 27, airways, and air channel 31 are within the covered seat of the seat assembly 13. In other embodiments, the seat assembly 13 is fully self-contained, meaning that the frame 35 is an internal frame, and one or more of the internal frame and the mounting bracket 39 are encompassed on at least five of its six sides by seat cover 21.

Figure 4:
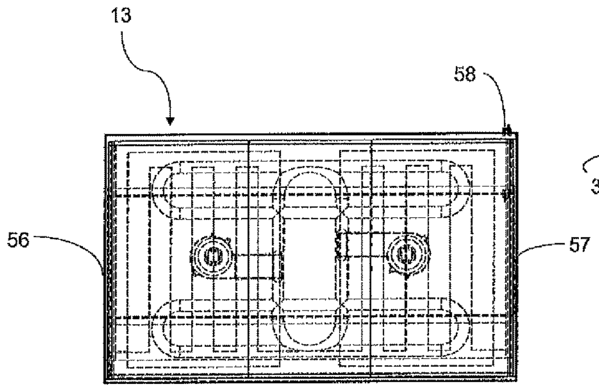
FIG. 4 is a top view of an enlarged schematic diagram of the seat of the locker of FIG. 1.

FIG. 4 depicts the components of the seat assembly 13 in a diagrammatic detail view, having the components arranged relative to each other. A first lateral edge 56 and a second lateral edge 57 are disposed between sidewalls 3 of the locker 1. A second opening or electrical port 58 is formed in a side of frame 35 between the first lateral edge 56 and the second lateral edge 57.

FIGS. 5 through 8 depict side, perspective, top, and rear views of the custom duct 47. The custom duct 47 includes a rounded, curved, or gradually sloping portion 59 and a squared, rectangular, or right-angled portion 61. The slope of the sloping portion 59 can have any degree of curvature as long as it slopes to a 90° angle. For example, any or all of dimensions 63, 65, and 67 may be varied to change the degree of curvature of the sloping portion 59. Preferably duct 47 is formed from a flat pattern and folded along bend lines to create the shape depicted. In other embodiments, duct 47 is cut or formed from a tube of metal, with its sloping portion 59 being brazed, soldered, welded, folded, or otherwise attached to the square/rectangular portion.

Preferably, duct 47 includes two parallel sides 69*a*, 69*b* that are folded to create an opening 71 that is arranged in the seat assembly 13 to channel airflow from an inlet of the duct 47 to an outlet. In other embodiments, one or more openings 71 are cut or otherwise formed on any of the surfaces of duct 47 depending on the configuration of the air channels 31, air sources 41, cushion 29, and/or frame 35. Preferably, the two parallel sides 69*a*, 69*b* are arranged to have a horizontal orientation relative to the seat assembly 13, however, other orientations, such as lateral and vertical orientations may also be used depending on at least the airway, air channel, and air port configuration of the cushion.

Figure 9:
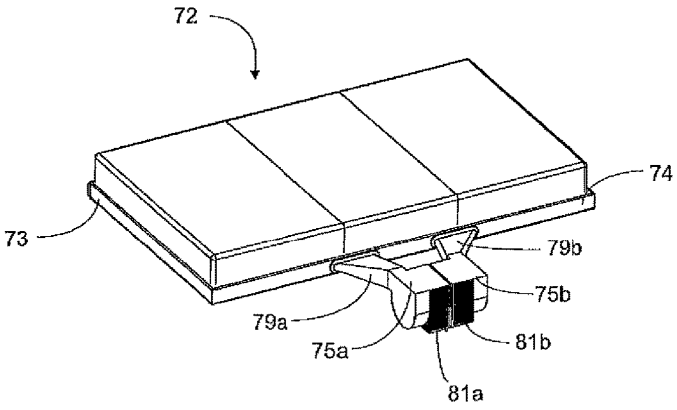
FIGS. 9 and 10 are perspective and rear views of an alternative embodiment of the seat of the locker of FIG. 1.
Figure 10:
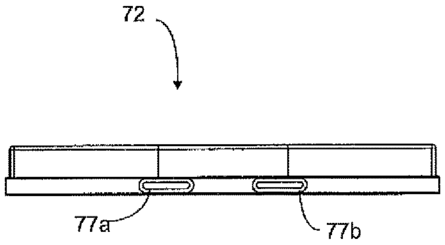

In FIGS. 9 and 10 an alternative embodiment of seat assembly 13 is depicted as seat assembly 72. The seat assembly 72 includes a frame 73 having a horizontal edge 74 configured to be connected with an external air source 75. In a preferred embodiment, the external air source 75 is a dual Peltier Unit configuration, having left and right Peltier Units 75*a*, 75*b*, and left and right mounting brackets 81*a*, 81*b*. In other embodiments, a shared external air source, such as an HVAC, may be used. An edge of the frame 73 includes one or more air source connectors 77. In a preferred embodiment, the air source connectors include left and right airway grommets 77*a*, 77*b*. When the seat 13 is configured to move between open and closed positions, the airway grommets 77*a*, 77*b* are located on an edge of the frame 73 that is opposite the hinged edge of the seat 72. In a closed position, the airway grommets 77*a*, 77*b* create a seal between the grommets and one or more custom air ducts 79*a*, 79*b*.

Figure 11:
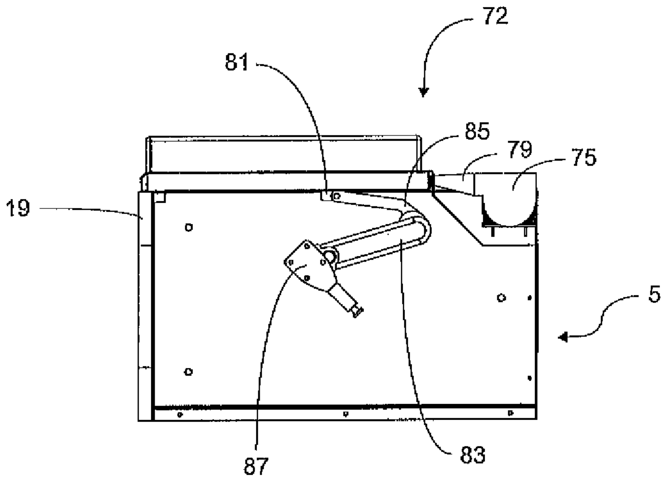
FIG. 11 is a side view of the alternative embodiment of the seat of the locker of FIG. 1.

FIG. 11 depicts a side view of a seat compartment 5 disposed beneath seat 72. Seat compartment 5 includes a stop member 81 secured to a sidewall 3 to slow and/or stop rotation of seat 72 when moving to the closed position. A stop member 81 includes a support strut 83 and hinge arm 85 connected to and/or between the stop member 81 and the sidewall 3 of the locker. It is oriented to abut and connect to an underside of seat 72 to securely prevent it from further rotation when moving to the open position. The open position may include lateral edges of the seat being parallel with, or extending away from, a pair of sidewalls 3. The support strut 83 maintains the open position and may have a damper 87 or soft-close feature attached and/or associated with it. An air cavity 53 is formed in a portion of the frame of seat assembly 72, connecting the cushion air channels and airways to the air cavity 53. Duct 79 connects the air cavity 53 to a Peltier Unit 75. The Peltier Unit 75 is configured to heat and cool an airflow exiting or passing through the Peltier Unit 75.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description and claims. Although the present embodiments are shown above, they are not limited to just these embodiments, but are amenable to various changes and modifications without departing from the spirit thereof.

We claim:

1. A locker, comprising:

a pair of upstanding locker sidewalls;

a rear locker wall disposed between the locker sidewalls; and a seat assembly; comprising:

a seat bench;

a cushion coupled to the seat bench; and at least one airflow channel formed in the cushion; and an HVAC system conductively coupled to the seat assembly.

2. The locker according to claim 1, further comprising:

a heat source.

3. The locker according to claim 2, wherein the heat source comprises at least one of:

a temperature-controlled heating pad;

a furnace associated with an HVAC; and a Peltier unit.

4. The locker according to claim 1, further comprising:

a network connector.

5. The locker according to claim 1, further comprising:

a wireless communications system.

* * * * *